(12) United States Patent
Keller et al.

(10) Patent No.: US 8,382,464 B2
(45) Date of Patent: Feb. 26, 2013

(54) EXTRUDED CELLULOSE-POLYMER COMPOSITION AND SYSTEM FOR MAKING SAME

(75) Inventors: Brian D. Keller, Oregon, WI (US);
David F. Dostal, Cambridge, WI (US);
Terry C. Laver, Oregon, WI (US);
Alfred B. England, Cincinnati, OH (US)

(73) Assignee: Strandex Corporation, Madison, WI (US)

(*) Notice: Subject to any disclaimer, the term of this patent is extended or adjusted under 35 U.S.C. 154(b) by 1449 days.

(21) Appl. No.: 11/856,431

(22) Filed: Sep. 17, 2007

(65) Prior Publication Data

US 2008/0113190 A1    May 15, 2008

Related U.S. Application Data

(60) Provisional application No. 60/844,827, filed on Sep. 15, 2006.

(51) Int. Cl.
*B32B 17/10*    (2006.01)
*B29C 47/00*    (2006.01)
*B29D 7/00*    (2006.01)

(52) U.S. Cl. .............. 425/192 R; 425/4 C; 425/197; 425/198; 425/376.1; 425/461; 264/46.1

(58) Field of Classification Search .......... 425/4 C, 425/817 C, 192 R, 197, 198, 376.1, 461; 264/46.1
See application file for complete search history.

(56) References Cited

U.S. PATENT DOCUMENTS 3,573,152 A    3/1971 Wiley et al.
(Continued)

FOREIGN PATENT DOCUMENTS

DE    10006162 A1    8/2001
EP    1172404 A1    1/2002
(Continued)

OTHER PUBLICATIONS

Lutskii, M. S., et al, Improvement of Equipment with a View to Raising Quality of Extruded Rubber Profiles, Jan. 1, 1990, Int'l Polymer Science & Tech., Rapra Tech., Shrewabury, GB, pp. T10-T12, XP000208739.

(Continued)

*Primary Examiner* — Joseph Del Sole
*Assistant Examiner* — Nahida Sultana
(74) *Attorney, Agent, or Firm* — Charles S. Sara; Daniel A. Blasiole; DeWitt Ross & Stevens S.C.

(57) ABSTRACT

The present invention is directed to a device for the production of a cellular wood plastic composite material comprised of an orifice that conducts the composite material from the adapter of the extruder to the transition die plate in such a manner that a uniform flow of material reaches the transition die plate; a transition die plate that further directs the flow of material to a flow restriction die plate in a manner ensuring that equal amounts of material are delivered to all areas of the flow restriction die plate; a flow restriction die plate that provides sufficient resistance to material flow to increase the melt pressure of the portion of the material that is upstream in relation to the flow restriction die plate and controls the temperature increase caused by this restriction by dividing the flow into numerous suitably sized and shaped streams; a compression die plate that fuses the separate streams issuing from the flow restriction die plate into a single stream of material and maintains the melt pressure at a level which will prevent premature development of cells in the material; a shaping die plate that is designed to shape the material in such a way that the fully expanded material will approximate the shape of the desired profile and to control the rate of cell development and expansion so that large numbers of uniform cells are produced.

15 Claims, 10 Drawing Sheets

U.S. PATENT DOCUMENTS

| | | | |
|---|---|---|---|
| 3,811,659 A | 5/1974 | Taylor et al. | |
| 3,836,302 A * | 9/1974 | Kaukeinen | 425/197 |
| 3,993,721 A * | 11/1976 | Soda et al. | 264/45.5 |
| 4,465,454 A * | 8/1984 | Duerr et al. | 425/461 |
| 4,708,623 A * | 11/1987 | Aoki et al. | 425/202 |
| 4,826,422 A * | 5/1989 | Hunter | 425/461 |
| 4,915,612 A * | 4/1990 | Gangeme et al. | 425/464 |
| 5,096,046 A * | 3/1992 | Goforth et al. | 198/604 |
| 5,516,472 A | 5/1996 | Laver | |
| 5,762,971 A * | 6/1998 | Schirmer | 425/133.1 |
| 5,811,048 A * | 9/1998 | Dunn et al. | 264/177.11 |
| 6,117,924 A | 9/2000 | Brandt | |
| 6,210,616 B1 * | 4/2001 | Suwanda | 264/151 |
| 6,296,468 B1 * | 10/2001 | Deutsch et al. | 425/198 |
| 6,344,504 B1 | 2/2002 | Zehner et al. | |
| 6,413,072 B1 * | 7/2002 | Brew et al. | 425/198 |
| 6,527,532 B1 * | 3/2003 | Muller et al. | 425/67 |
| 6,632,863 B2 * | 10/2003 | Hutchison et al. | 524/13 |
| 7,448,318 B1 * | 11/2008 | Ralicki | 100/116 |
| 7,637,732 B2 * | 12/2009 | Williams | 425/313 |
| 2005/0046072 A1 * | 3/2005 | Shalkey | 264/169 |
| 2006/0105072 A1 | 5/2006 | Hughes | |
| 2008/0113190 A1 * | 5/2008 | Keller et al. | 428/339 |
| 2010/0015267 A1 * | 1/2010 | Keller et al. | 425/113 |

FOREIGN PATENT DOCUMENTS

| | | |
|---|---|---|
| JP | 55 032647 A | 3/1980 |
| WO | WO2005/044536 A2 | 5/2005 |
| WO | WO 2007/015763 A1 | 2/2007 |
| WO | WO 2008/034127 A1 | 3/2008 |

OTHER PUBLICATIONS

Khettry, A., et al., "Real-time Analysis of Ethylene Vinyl Acetate Random Copolymers Using Near Infrared Spectroscopy During Extrusion," Polymer Engineering & Science, Brookfield Center, US, vol. 36, No. 9, May 15, 1996, pp. 1232-1243, XP000594994.

\* cited by examiner

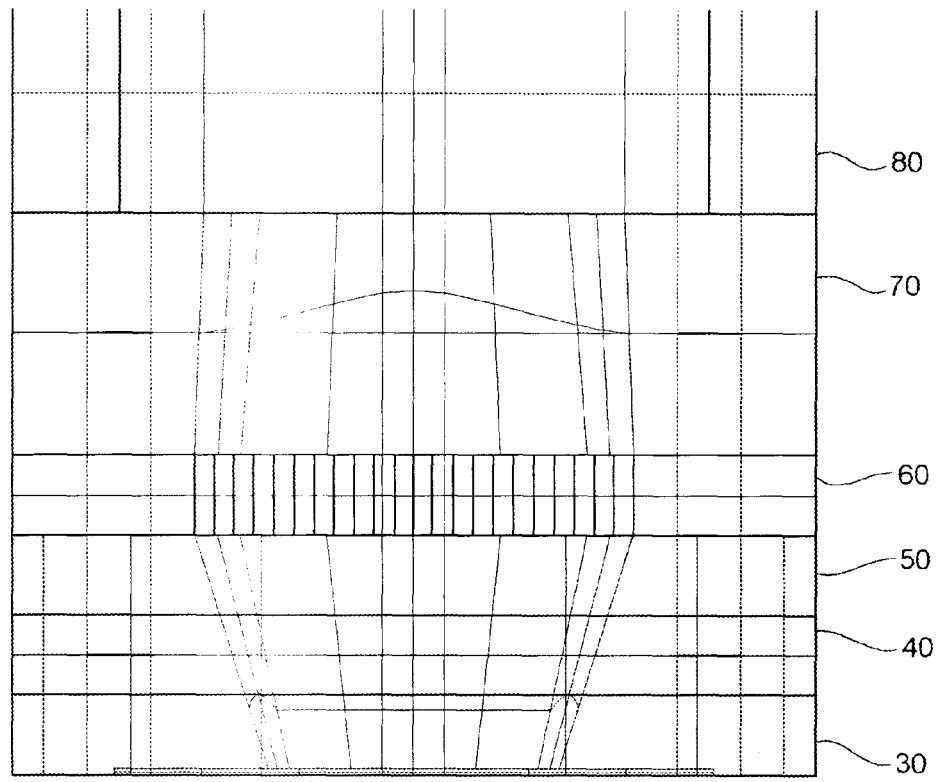
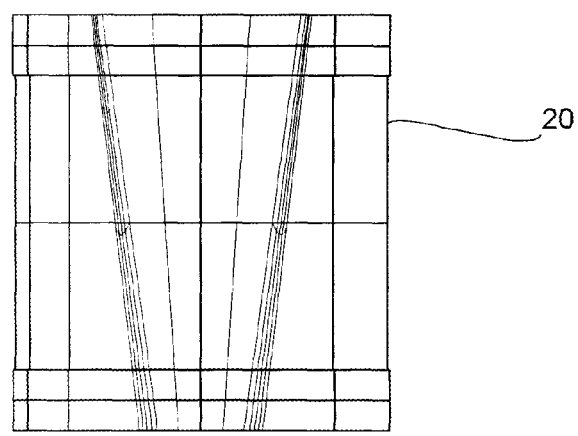
FIG. 3

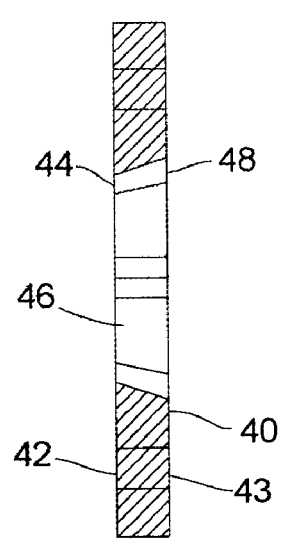 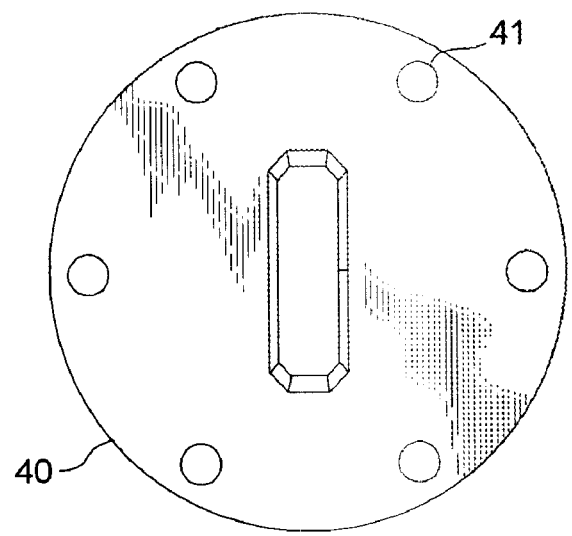
FIG. 6A    FIG. 6B
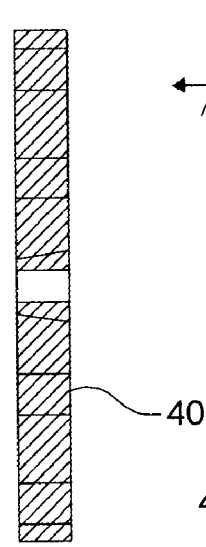 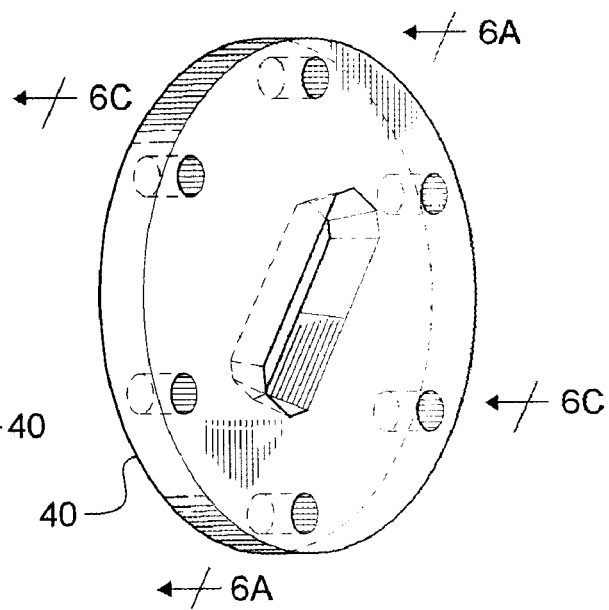
FIG. 6C    FIG. 6D

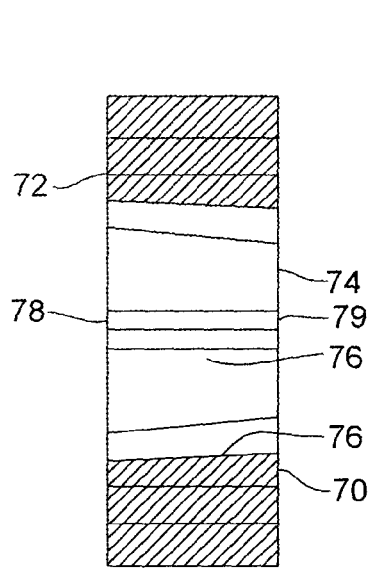 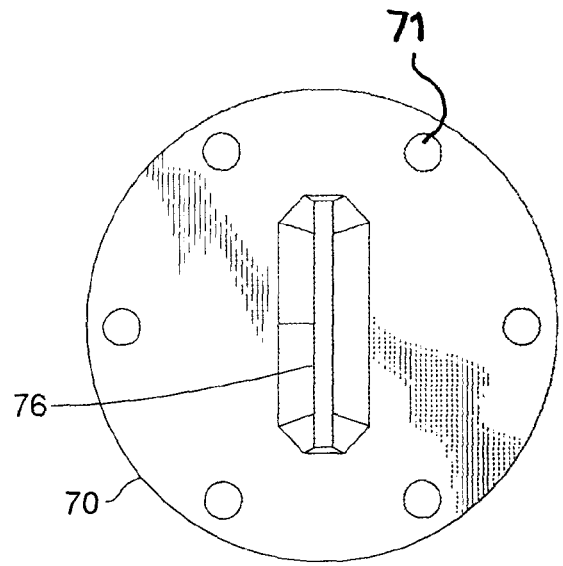
FIG. 9A   FIG. 9B
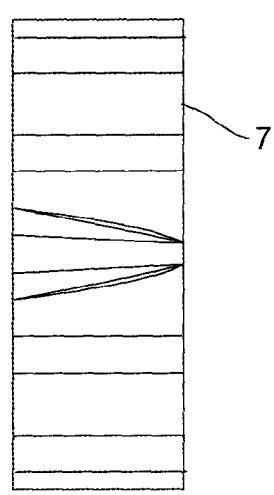 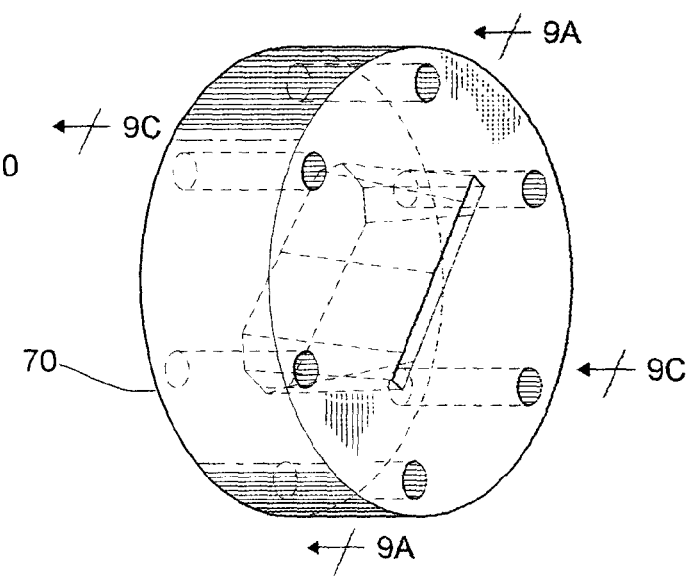
FIG. 9C   FIG. 9D

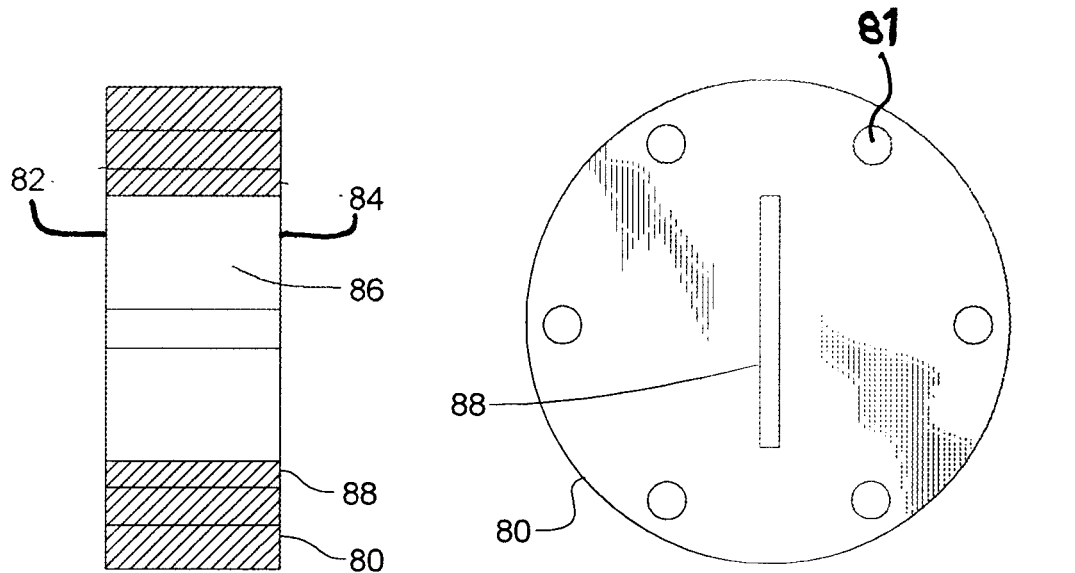
FIG. 10A
FIG. 10B
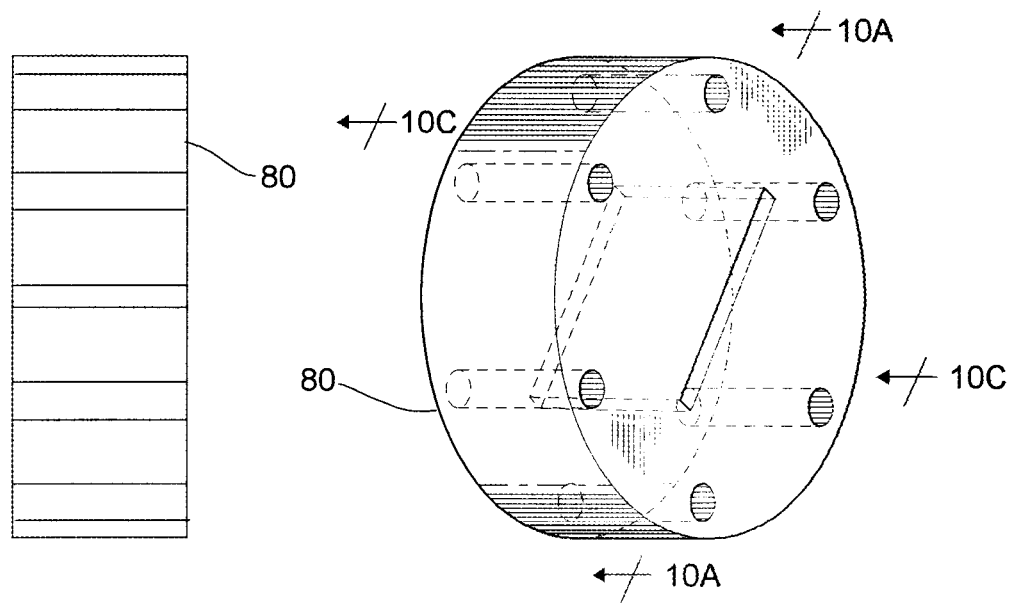
FIG. 10C
FIG. 10D

EXTRUDED CELLULOSE-POLYMER COMPOSITION AND SYSTEM FOR MAKING SAME

REFERENCE TO RELATED APPLICATION

The application claims priority to U.S. Provisional Application entitled "Extruded Cellulose-Polymer Composition and System for Making Same," Ser. No. 60/844,827, filed Sep. 15, 2006, which is incorporated herein by reference in its entirety.

FIELD OF THE INVENTION

The present invention is directed to an extruded wood-polymer composite material suitable for use in place of natural wood and to a die, machine and process for manufacturing the composite material.

DESCRIPTION OF THE PRIOR ART

U.S. Pat. No. 5,516,472 to Layer is incorporated by reference in its entirety. Layer teaches the use of a stranding die in the extrusion of a synthetic wood comprised predominantly of a thermoplastic material and cellulosic filler. The stranding die produces a plurality of strands which are then compressed and fused together in a molding die. The compressed mass then passes through a shaping die plate where the final profile shape is established. This arrangement does not allow for expansion of the profile after it exits the shaping die plate and, as a result, does not give the reduction in density desired in a cellular composite.

Extrusion of cellular, i.e., foamed, wood plastic composites depends on the formation of gas bubbles or cells within the composite matrix. If the gas can be introduced under pressure, it will be more evenly dispersed throughout the matrix resulting in a more uniform cell structure with an increased number of cells. This type of structure is accepted as being more desirable. Development of pressure in the extrusion process is a result of restriction of the flow of the extrudate. The first problem encountered was development of suitable pressure while producing a profile with a large enough cross section to be useful. Obviously, a large profile necessarily involves a lesser degree of restriction of the extrudate flow than a small profile.

It is possible to increase the amount of restriction when extruding a large profile by dividing the flow into multiple channels. One method of dividing the flow is presented in U.S. Pat. No. 3,573,152 to Wiley et al. Wiley et al. teach the use of multiple orifices in a die for the purpose of increasing pressure in a molten plastic mass containing a foaming agent when the opening of the die is too large to produce the pressure required by the foaming process. These orifices are spaced so that the desired degree of expansion will occur when the molten plastic streams expand due to the presence of gas bubbles produced by the blowing agent and occupy the space between the orifices. A portion of the die downstream from the orifices may contain the expanded streams so that they conform to some desired shape but do not retard the expansion. Very low density foams are made by this process.

Division of the flow into multiple channels causes a secondary problem. The divided flows must be fused back together again to form a cohesive structure. During extrusion of the unfilled polymer foams described by Wiley et al., the expanding streams readily adhere to one another. Addition of wood and/or other fillers to the polymer introduces a difficulty. The resulting composite streams will not adhere sufficiently without additional compression because the amount of polymer on the surface has been reduced by the added filler. The polymer streams produced by the process revealed by Wiley et al. are too widely spaced to produce a cohesive mass necessary for the production of a cellular composite profile with a unified structure. Compression of the strands or streams after the orifice is required.

The stranding plate revealed by Layer will produce a flow restriction by dividing the extrudate flow, but the orifice size must be adapted to produce optimum conditions for cell formation. The molding die presented in Layer must also be adapted to produce the amount of compression necessary to create a cohesive mass without increasing the temperature of the extrudate.

The purpose of this invention is to provide a means of creating sufficient restriction of extrudate flow to cause the increase in pressure necessary for effective cell formation when extruding a large profile while at the same time providing a means of producing a profile with a cohesive structure.

SUMMARY OF THE INVENTION

Referring now to the figures for an exemplary version of the system of the present invention, the present invention is directed to a die system 14 for extruding a cellular, foamed extrudate from an extruder 12, the extruder 12 including an exit opening 13, and forming a composite molded extrudate product having a substantially uniform cell structure from a mixture of organic fibrous material and thermoplastic material. The die system 14 includes the following plates:

a. an adapter die plate 20, removably connected to the extruder 12 for receiving the extrudate from the exit opening 13 of the extruder 12, the adapter die plate 20 including a front opening 22, a rear opening 23 and a flow channel 26 connecting the front opening 22 to the rear opening 23;

b. at least one transition die plate 30 adjacent the adapter die plate 20, the transition die plate 30 including a front opening 31, a rear opening 33 and a flow channel 32 connecting the front opening 31 to the rear opening 33;

c. a flow restriction die plate 60 adjacent the transition die plate 30, the flow restriction die plate 60 having a front opening 65, a rear opening 67 and a flow channel 63 connecting the front opening 65 to the rear opening 67, wherein the flow channel 63 includes a plurality of stranding channels 68 to divide the flow of extrudate, wherein the stranding channels 68 have a diameter and length to provide sufficient resistance pressure to the extrudate flow such that the resistance pressure of the extrudate entering the adapter die plate 20 is increased, wherein the increase in resistance pressure alters the extrudate entering the adapter die plate 20 such that the extrudate entering the adapter die plate 20 is characterized by increased uniform cell structure and lower density, wherein flow channel 32 of the transition die plate 30 is shaped such that the flow of extrudate to the flow restriction die plate 60 ensures that equal amounts of extrudate are delivered to the stranding channels 68;

d. a compression die plate 70 adjacent the flow restriction die plate 60 and comprising a front opening 72, a rear opening 74 and a flow channel 76, wherein the compression die plate front opening 72 is adjacent the flow restriction die plate rear opening 67, wherein the compression die plate flow channel 76 is shaped to reform the extrudate into a single stream of extrudate and wherein further the compression die plate flow channel 76 is shaped to maintain the melt pressure of the extrudate at a level which will prevent premature development of cells in the extrudate material;

e. a shaping die plate 80 adjacent the compression die plate 70 and comprising a front opening 82, a rear opening 84 and a flow channel 86, wherein shaping die plate front opening 82 is adjacent the compression die plate rear opening 74 and wherein the shaping die plate flow channel 86 is shaped to approximate the shape of the desired profile of a final extruded product 16 and to control the rate of cell development and expansion so that large numbers of uniform cells are produced, wherein ratio of the volume of flow channels 32, 46 and/or 56 of the transition die plates 30, 40, and/or 50 to the volume of the shaping die plate 80 ranges from 1.05:1 to 3.45:1.

The present invention is also directed to a process for forming a cellular, foamed extrudate from an extruder 12, the extruder 12 including an exit opening 13, and forming a composite molded extrudate product 16 having a substantially uniform cell structure from a mixture of organic fibrous material and thermoplastic material, the process comprising the following steps:

a. mixing the cellulosic material and thermoplastic material in a hopper 10;

b. forwarding the mixed material to an extruder 12 to form an extrudate;

c. passing the extrudate through an adapter die plate 20 removably connected to the extruder 12 for receiving the extrudate from the exit opening 13 of the extruder 12, the adapter die plate 20 including a front opening 22, a rear opening 23 and a flow channel 26 connecting the front opening 22 to the rear opening 23;

d. passing the extrudate through at least one transition die plate 30 adjacent the adapter die plate 20, the at least one transition die plate 30 including a front opening 31, a rear opening 33 and a flow channel 32 connecting the front opening 31 to the rear opening 33 wherein the transition die plate flow channel 32 has a shape designed to transform the extruded material discharged from the flow channel 26 of the adapter die plate 20 to a shape more generally approaching that of a finished extruded product;

e. passing the extruded material through a flow restriction die plate 60 adjacent the transition die plate 30, the flow restriction die plate 60 having a front opening 65, a rear opening 67 and a flow channel 63 connecting the front opening 65 to the rear opening 67, wherein the flow channel 63 includes a plurality of contiguous stranding channels 68 to divide the flow of extrudate, wherein the stranding channels 68 have a diameter and length designed to increase the resistance pressure to the extrudate, wherein the increase in resistance pressure alters the extrudate entering the adapter die plate 20 such that the extrudate entering the adapter die plate 20 is characterized by increased uniform cell structure and lower density, wherein flow channel 32 of the transition die plate 30 is shaped such that the flow of extrudate to the flow restriction die plate 60 ensures that equal amounts of extrudate are delivered to the stranding channels 68;

f. passing the extruded material through a compression die plate 70 adjacent the flow restriction die plate 60, the compression die plate 70 comprising a front opening 72, a rear opening 74 and a flow channel 76, wherein the compression die plate front opening 72 is adjacent the flow restriction die plate rear opening 67, wherein the front face 72 of the flow channel 76 of the compression die plate 70 has a profile equal to the profile of the area of all of the channels 68 within the flow channel 63 in the flow restriction die plate 60 plus the area of the metal that defines the areas between the multiple channels 68 together which make up the flow channel 63 of the flow restriction die plate 60, wherein the compression die plate flow channel 63 is shaped to reform the extrudate into a single stream of extrudate and wherein further the compression die plate flow channel 76 is shaped to maintain the melt pressure at a level which will prevent premature development of cells in the material;

g. passing the extruded material to a shaping die plate 80, the shaping die plate 80 adjacent the compression die plate 70 and comprising a front opening 82, a rear opening 84 and a flow channel 86, wherein shaping die plate front opening 82 is adjacent the compression die plate rear opening 74 and wherein the shaping die plate flow channel 86 is shaped to approximate the shape of the desired profile of a final extruded product 16 and to control the rate of cell development and expansion so that large numbers of uniform cells are produced; and h. cooling the extruded product material in the cooling tank 18.

The present invention is also directed to a composite molded product having a substantially uniform cell structure from a mixture of cellulosic material and thermoplastic material having the following characteristics:

a. a density of from 0.50 gm/cc to 0.90 gm/cc, b. a flexural modulus of elasticity ranging from 100 ksi to 250 ksi, c. a coefficient of linear thermal expansion (CLTE) ranging from $24.5 \times 10^{-6}$ in/in-° F. to $32.0 \times 10^{-6}$ in/in-° F., and d. a filler to resin ratio ranging from 0.75:1 to 1:1.

One of the main advantages to this process is that the final molded product has virtually no expansion after it leaves the molding die. This is due to the low temperature processing in the extruder and die system as well as the unique design of the plates.

The unique die system of the present invention allows the combined starting materials to bond into a shaped, homogeneous product wherein the final extruded product has a desired reduction in cell density by creating a sufficient restriction of extrudate flow to cause the increase in pressure necessary for effective cell formation when extruding a large extrudate profile and provide a means of producing a profile with a cohesive structure.

The objects and advantages of the invention will appear more fully from the following detailed description of the preferred embodiment of the invention made in conjunction with the accompanying drawings and attachments.

BRIEF DESCRIPTION OF THE DRAWINGS

FIG. 3 is a cross-sectional view of the die system of the present invention illustrating each of the die plates.

FIG. 6A is a cross-sectional view of the transition die plate 40 of the present invention taken along lines 6A-6A of FIG. 6D.

FIG. 6B is a front elevated view of the transition die plate 40 of FIG. 6A.

FIG. 6C is a cross-sectional view of the transition die plate 40 of FIG. 6A taken along lines 6C-6C of FIG. 6D.

FIG. 6D is a perspective view of the transition die plate 40 of FIG. 6A.

FIG. 9A is a cross-sectional view of the compression die plate 70 of the present invention taken along lines 9A-9A of FIG. 9D.

FIG. 9B is a front elevated view of the compression die plate 70 of FIG. 9A.

FIG. 9C is a cross-sectional view of the compression die plate 70 of FIG. 9A taken along lines 9C-9C of FIG. 9D.

FIG. 9D is a perspective view of the compression die plate 70 of FIG. 9A.

FIG. 10A is a cross-sectional view of the shaping die plate 80 of the present invention taken along lines 10A-10A of FIG. 10D.

FIG. 10B is a front elevated view of the shaping die plate 80 of FIG. 10A.

FIG. 10C is a cross-sectional view of the shaping die plate 80 of FIG. 10A taken along lines 10C-10C of FIG. 10D.

FIG. 10D is a perspective view of the shaping die plate 80 of FIG. 10A.

DETAILED DESCRIPTION OF THE INVENTION

Figure 1:
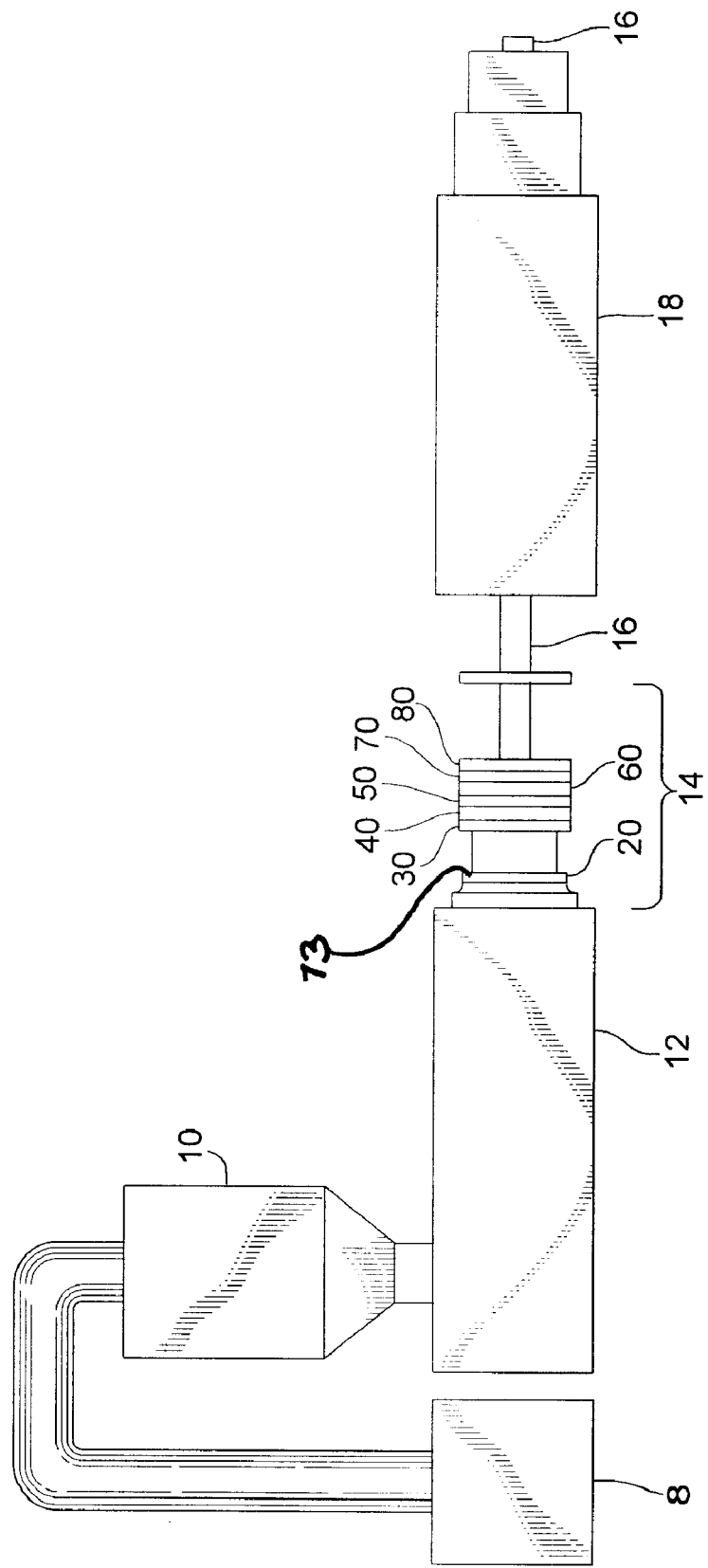
FIG. 1 is a flow chart illustrating the process of the present invention.

Reference is made to Layer for an explanation of the general practice of composite wood extrusion techniques. With the exception of the actual cellular composite extrusion die of the present invention and unless otherwise noted, Layer is incorporated herein to describe the standard extrusion practices.

The present invention is directed to a wood-polymer composite product, as well as the process and machine for making the product. The invention is specifically directed to the combination of a low-temperature extruder and the die system.

Cellulosic Materials:

The cellulosic fibrous-polymer composite material of the present invention is characterized by having a higher cellulosic fiber content than normally recognized in the prior art. While the prior art normally requires a material content including approximately 50% fiber to 50% thermoplastic material, the material of the present invention preferably has a higher fiber content. The material can have up to a near 1:0 fiber/thermoplastic content by employing the continuous low temperature extrusion process of the present invention and the proper mix of starting materials. The basic process requires mixing of basic types of raw materials including cellulosic fibers and thermoplastic materials. Cross-linking agents and process lubricants may also be included in the basic mixture.

One advantage of the present invention is that it can incorporate virtually any kind of waste cellulosic material from sawdust to pond sludge and newspapers. As described earlier, any cellulosic material may be used as a raw material including old newspapers, alfalfa, wheat pulp, wood chips, wood particles, wood flour, wood flakes, wood fibers, ground wood, wood veneers, wood laminates, kenaf, paper, cardboard, straw, and other cellulosic fibrous materials. The cellulosic fibrous material may also comprise refined cellulose such as cotton or viscous and plant fibers such as kenaf, bamboo or palm fiber, straw or any other cellulosic fibrous material. Prior to being combined with the other starting materials, the cellulosic materials should be dried to a moisture content between approximately 1% and 9%. A preferred moisture content is no more than 2%. Drying technologies are known to the art. A suitable example is a desiccant dryer manufactured by Premier Pneumatics, Inc. (Allentown, Pa.).

Thermoplastic Materials:

The thermoplastic materials serve primarily as a process fluidizer. Most types of thermoplastic materials may be used, examples of which include multi-layer films, virgin thermoplastics such as polyethylene, polypropylene, poly-vinyl chloride (PVC), low density polyethylene (LDPE), copoly-ethylene-vinyl acetate and waste plastic sawdust from other industries as well as other recyclable polymer materials. Although thermoplastic materials are a preferable component in the make-up of the starting materials, it is not required. As long as the starting material includes a sufficient amount of cross-linking agents and lubricants to "plasticize" the mixture in the extruder, the starting materials do not necessarily require the use of thermoplastic materials.

The ratio of cellulosic fibers to the thermoplastic material is, therefore, between approximately 4:1 and 1:0. Preferably the ratio between the cellulosic fibers to the thermoplastic material is approximately 1:1.

Cross-Linking Agents:

The cross-linking agent serves to strengthen the bond between the several strands of the cellulosic fibers into a final homogenous product. The cross-linking agents bond across the pendent hydroxy groups on the cellulose molecular chain. Cross-linking agents must have the characteristics of forming a strong bond at relatively low temperatures. Examples of cross-linking agents include polyurethanes such as isocyanate, phenolic resins, unsaturated polyesters and epoxy resins and combinations of the same. The phenolic resins may be any single stage or two stage resin preferably with a low hexane content. Although the starting material may comprise a cross-linking agent to strengthen the bonds between the cellulosic fiber strands, the cross-linking agent is not required to form the final product contemplated by the inventive process as long as thermoplastic and cellulosic materials are included in the starting material.

Lubricants:

Lubricants, which are common commercial lubricants known to the art of plastic processing, behave as a process aid. Examples of typical lubricants include zinc stearate, which is an internal lubricant and paraffin-type wax, which is an exterior lubricant.

Other Materials:

Other materials, which can be added, are known to the art of extrusion and include accelerators, inhibitors, enhancers, compatibilizers and blowing agents. Accelerators, inhibitors, enhancers and compatibilizers are agents which control the speed at which the cross-linking agents work. Accelerators are added to increase the speed of the cross-linking reaction. Examples of accelerators include amine catalysts such as Dabco® BDO (Air Products, Allentown, Pa.) and DEH40® (Dow Chemical). Inhibitors are added to retard the speed of the cross-linking reaction. Examples of known inhibitors include organic acids such as citric acid. Enhancers are used to increase the reactivity between components. Examples of enhancers include cobalt derivatives. Compatibilizers are used to form a more effective bond between cellulosic materials and thermoplastics. Examples of compatibilizers include ethylene-maleic anhydride copolymers. Blowing agents are added to decrease density. An example of a blowing agent is CELOGEN® TSH (Uniroyal Chemical).

There are many formulation recipes which can be prepared for the starting mixture.

The following table includes four examples (expressed in pounds of material):

| RECIPE | I | II | III | IV |
|---|---|---|---|---|
| Wood Flour | 25.00 | 25.00 | 25.00 | 25.00 |
| Polyethylene | 15.00 | 12.50 | 15.00 | 7.50 |
| Zinc Stearate | .75 | 1.50 | 1.00 | 1.25 |
| Wax | .50 | .50 | .50 | .75 |
| Phenolic Resin | 1.50 | .00 | .00 | 8.50 |
| Isocyanate | .50 | 1.00 | .00 | .00 |
| Epoxy Resin | .00 | .00 | 2.50 | .00 |
| Catalyst | .00 | .00 | .075 | .00 |

The preferred formulation is as follows:

| MATERIAL | AMOUNT (PARTS) |
|---|---|
| Wood Flour (40 Mesh) | 100.0 |
| Polyethylene (HDPE) | 40.0 |
| Zinc Stearate | 3.0 |
| External Wax | 2.0 |
| Phenolic Resin | 6.0 |
| Blowing Agent | 1.5 |

The wood flour is dried to 2% moisture content or less. The polyethylene (HDPE) and polyurethane are mixed in a ribbon blender until absorbed, approximately five minutes. The remaining ingredients are added to the mixture, and blended for approximately three minutes or until evenly mixed under conditions known to the art.

Referring now to the figures, wherein the same reference numbers relate to the same or similar features throughout the figures, FIG. 1 illustrates a flow diagram of the process of the present invention.

Hopper:

In the first step, the cellulosic fiber and thermoplastic raw materials are first shredded according to methods known to the art, physically mixed with cross-linking agents and process lubricants in a blender 8, and subsequently placed into a feed hopper 10. The cellulose materials are comminuted by conventional particle reduction equipment known to the art. These may include grinders, ball mills, choppers or other equipment capable of reducing the fiber to a flour of a distinct particle size or range of sizes. A 40-mesh flour appears to be the best form but good results have been obtained with both coarser and finer materials.

The mixing of the materials prior to loading the extruder 12 may be accomplished by any simple mixing device. No heat is required during mixing and only an even distribution of the various components is required. A drum tumbler may be used for small quantities or a larger batch-type mixer such as a ribbon blender known to the art may be used.

A typical feed hopper used in this process may be a gravity feed, starve feed or force feed (also known as a "crammer") hopper, depending on the flow characteristics of the particular compound.

Extruder 12:

This mixture of raw materials is then delivered to a heated extruder 12. The extruder 12 utilizes low temperature mixing and extruding. This is unique in that most plastic mixing processes require mixing at a plasticization temperature, which is quite high. The present mixing temperature is substantially lower, preferably around 180° F. (82° C.). The material passing through the extruder creates a mass of homogenous material at a certain temperature, approximately 1850-200° F. (850-93° C.) depending upon the particular compound. The present invention can be processed with any capacity extruder. A counter-rotating and intermeshing twin screw, high pressure, extruder manufactured by Cincinnati Milacron (CM-55-HP) may be used in the preferred embodiment. Preferably, the process is accomplished by twin screw extruders, which are heated to process temperatures sufficient to blend the product together into a homogenous mixture at low temperature.

Temperature:

In the low temperature, high pressure extruder 12, the materials are blended, heated and then forced into a die system. The extruder 12 of the present invention requires only that the product be brought to a blending or homogenizing temperature, which is less than plasticization temperatures. The temperature of the extruder 12 is controlled by the extrusion speed, external extruder heaters, shearing action and heaters in the die system and monitored by thermocouples and other monitoring circuits. The purpose of the thermocouples is to monitor the heat at each station. The bulk temperature is significantly lower, e.g., about 150°-200° F. (660-93° C.) than the "true melt" of the thermoplastic fluidizers.

Flow Rate:

The flow rate of the extruder 12 may be between about 100 and 2500 pounds per hour. In the preferred embodiment the flow rate is approximately 600 pounds per hour with a temperature at approximately 180° F. (82° C.). The product leaving the extruder 12 is essentially unbounded round stock. Various sized extruder orifices are available with a range from 25 millimeters (mm) to 72 mm. In the preferred embodiment a 38 mm orifice is used.

Die System 14:

The materials are blended, heated and then extruded into a die system 14. The die system 14 is made up of a series of die plates, which will be explained below with reference to FIGS. 2-10. The unique die system 14 allows the starting materials to bond and form a shaped-homogeneous product. Each of the plates can be made of materials known to the art to accomplish the necessary purpose. Typical materials include cast iron and stainless steel.

The volume of extrudate allowed into the die system 14 is controlled by the adapter die plate 20, which is illustrated in detail in FIGS. 4A-4D, and further by the shapes of the transition die plates 30, 40 and 50, illustrated in FIGS. 5A-5D through FIGS. 7A-7D, respectively, the flow restriction die plate 60, as illustrated in FIGS. 8A-8D, the compression die plate 70, as illustrated in FIGS. 9A-9D, and the shaping die plate 80, as illustrated in FIGS. 10A-10D. The flow restriction die plate 60 is the fundamental part of this invention. The accompanying dies are designed to provide the material flow required to make the flow restriction die plate 60 effective.

Adapter Die Plate 20:

Extruded material enters the cellular composite extrusion die system 14 through the adapter die plate 20. The adapter die plate 20 serves as a conduit through which material passes from the extruder 12 to the transition die plates 30, 40, and 50.

The adapter die plate 20 connects the die system 14 to the exit opening 13 of the extruder 12. As illustrated in FIGS. 4A-4D, the adapter die plate 20 includes a front face 24, a rear face 25, and a flow channel 26. The flow channel 26 narrows in diameter from the front face 24 to the rear face 25. The flow channel 26 passing through the adapter die plate 20 is designed to direct the flow of material equally to all areas of the transition die plates 30, 40, and 50. Typically, flow channel 26 is available in sizes ranging from 50 mm to 300 mm.

Figures 4A, 4B:
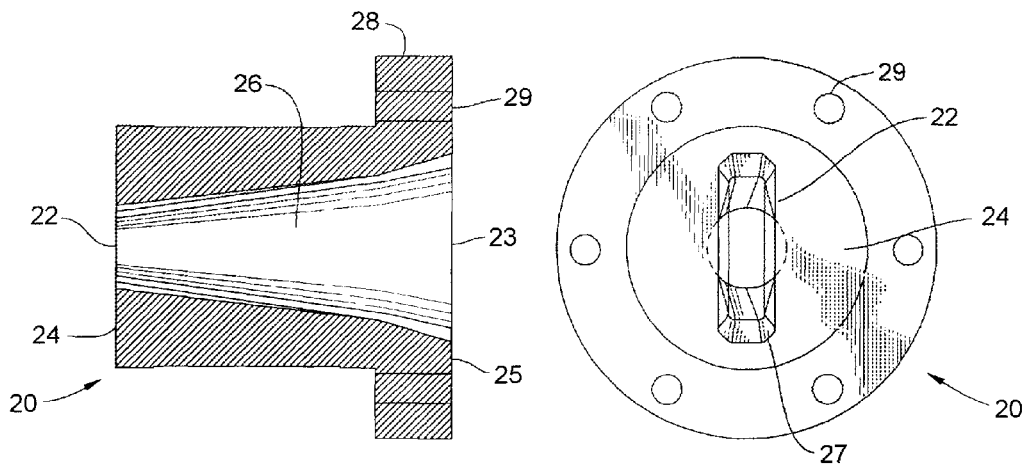
FIG. 4A is a cross-sectional view of the adapter die plate 20 of FIG. 3 taken along lines 4A-4A of FIG. 4D.
FIG. 4B is a front elevated view of the adapter die plate 20 of FIG. 4A.

FIG. 4B shows a front elevated view of the adapter die plate 24. The front face 24 of the adapter die plate 20 comprises a cylindrical front opening 22, which can accommodate a twin screw extruder 12, at the end of the flow channel 26 nearest the extruder 12 and an oval-shaped rear opening 23. Bolt holes 29 are contained near the edge of the front face 24 of the adapter die plate 20 to secure the adapter die plate 20 to the extruder 12.

Figures 4C, 4D:
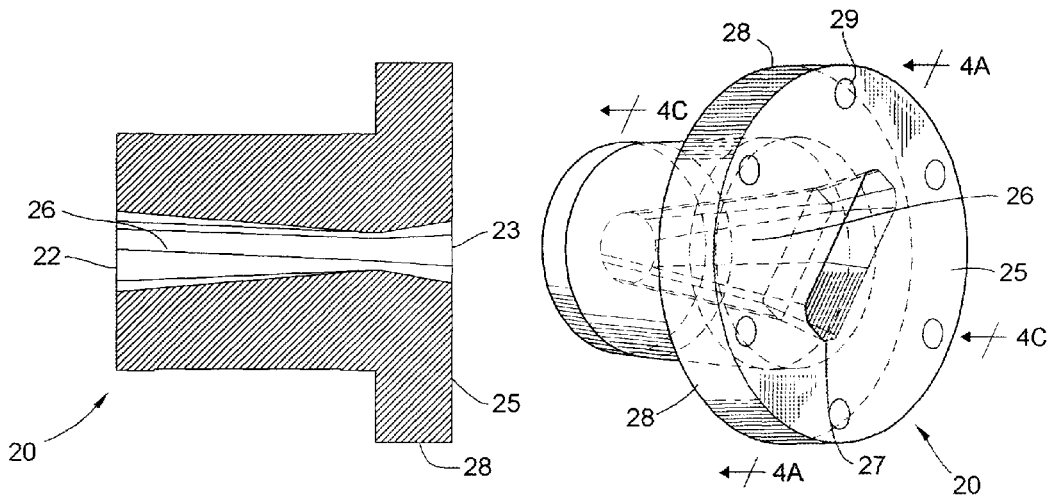
FIG. 4C is a cross-sectional view of the adapter die plate 20 of FIG. 4A taken along lines 4C-4C of FIG. 4D.
FIG. 4D is a perspective view of the adapter die plate of FIG. 4A.
Figures 5A, 5B:
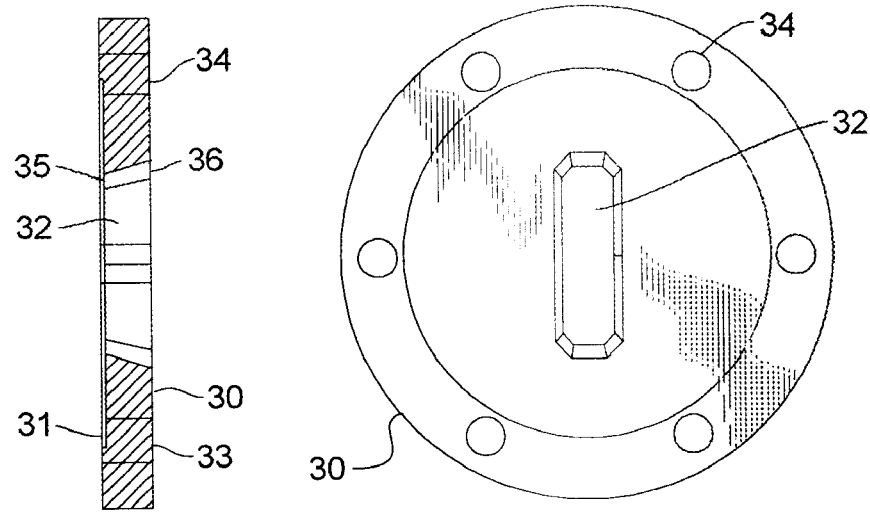
FIG. 5A is a cross-sectional view of the transition die plate 30 of the present invention taken along lines 5A-5A of FIG. 5D.
FIG. 5B is a front elevated view of the transition die plate 30 of FIG. 5A.
Figures 5C, 5D:
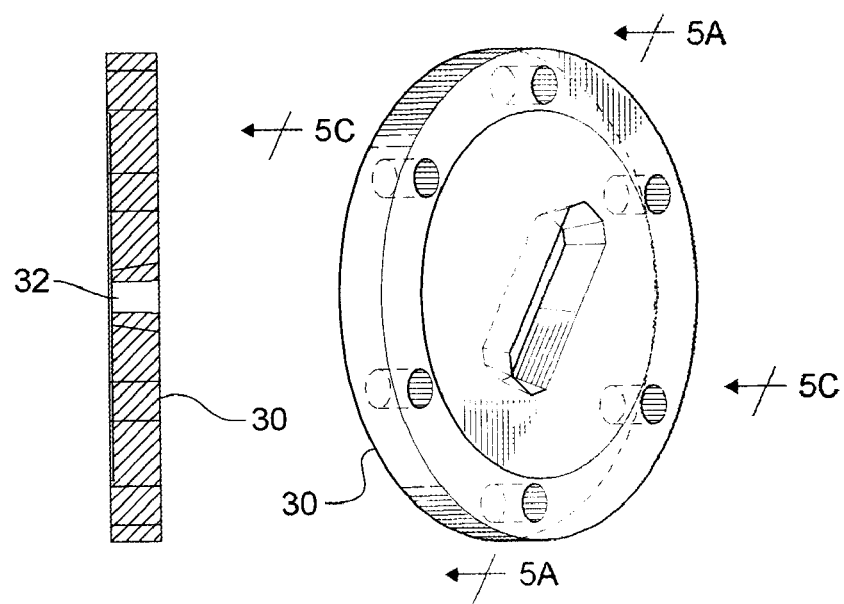
FIG. 5C is a cross-sectional view of the transition die plate 30 of FIG. 5A taken along lines 5C-5C of FIG. 5D.
FIG. 5D is a perspective view of the transition die plate 30 of FIG. 5A.
Figures 7A, 7B:
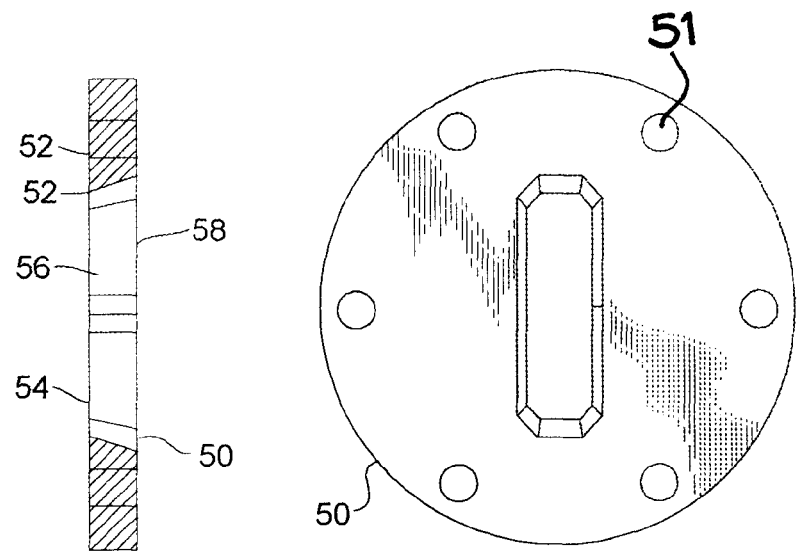
FIG. 7A is a cross-sectional view of the transition die plate 50 of the present invention taken along lines 7A-7A of FIG. 7D.
FIG. 7B is a front elevated view of the transition die plate 50 of FIG. 7A.
Figures 7C, 7D:
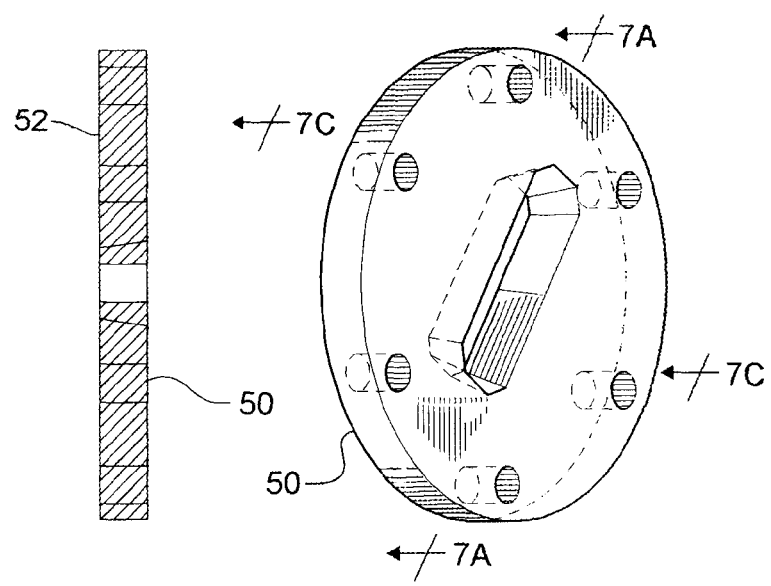
FIG. 7C is a cross-sectional view of the transition die plate 50 of FIG. 7A taken along lines 7C-7C of FIG. 7D.
FIG. 7D is a perspective view of the transition die plate 50 of FIG. 7A.
Figures 8A, 8B:
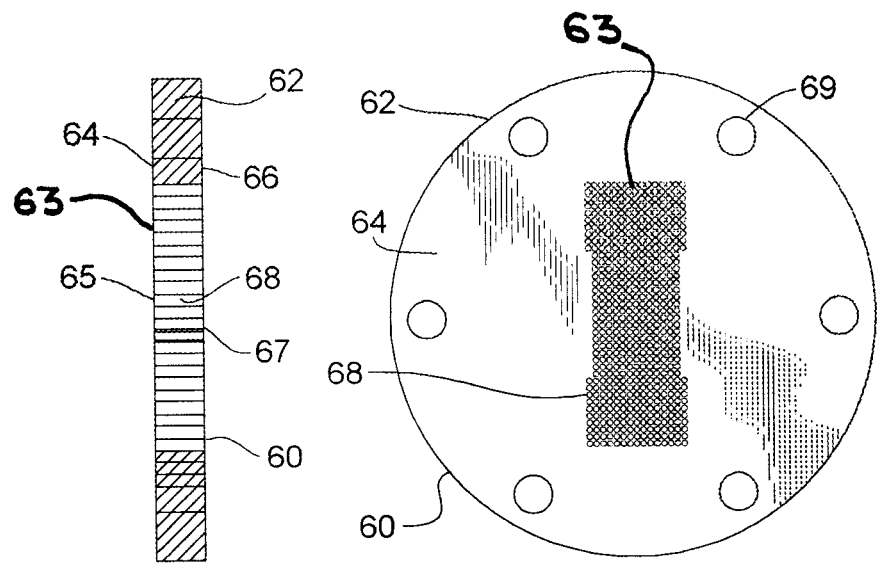
FIG. 8A is a cross-sectional view of the flow restriction die plate 60 of the present invention taken along lines 8A-8A of FIG. 8D.
FIG. 8B is a front elevated view of the flow restriction die plate 60 of FIG. 8A.
Figures 8C, 8D:
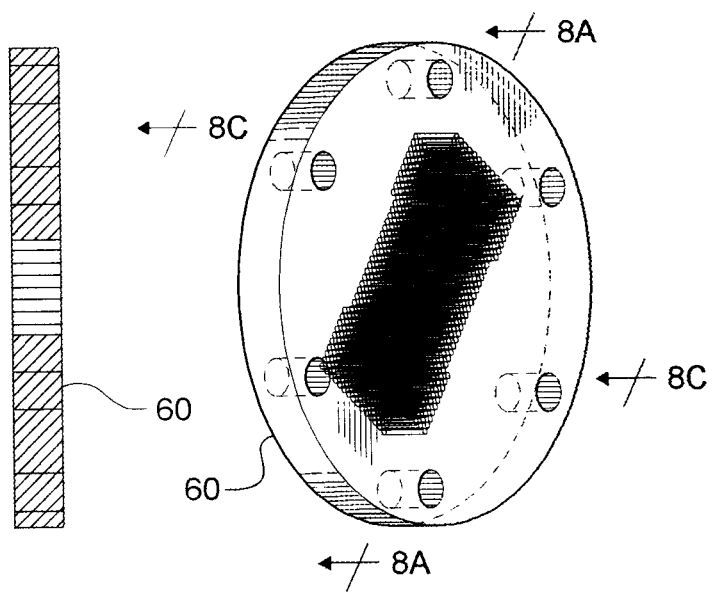
FIG. 8C is a cross-sectional view of the flow restriction die plate 60 of FIG. 8A taken along lines 8C-8C of FIG. 8D.
FIG. 8D is a perspective view of the flow restriction die plate 60 of FIG. 8A.

FIG. 4D shows the adapter die plate 20 in perspective view. The rear face 25 of the adapter die plate 20 comprises an oval orifice 27 which is located at that end of the flow channel 26 which is nearest to the transition die plate 30. The rear face 25 of the adapter die plate 20 further comprises an extended portion 28 which is designed to nest within a shallow flow channel 32 which comprises part of the transition die plate 30. A second set of bolt holes 34 is contained within the transition die plate 30 to mesh with the bolt holes 29 in the extended portion 28 of the rear face 25 of the adapter die plate 20 to secure the transition die plate 30 to the adapter die plate 20.

Transition Die Plates:

As illustrated in FIGS. 5-7, the transition die plates 30, 40, 50 are designed to transition and direct the flow of extruded material to all areas of the flow restriction die plate 60 at a uniform rate. Although three transition die plates 30, 40, 50 are illustrated in the figures, it is within the scope of the present invention to use one or two transition die plates in the die system 14. If one or two of the transition die plates are used, the width of the plates will generally be thicker. Splitting the transition die plate into three separate die plates 30, 40, 50 allows for easier machining of the complex shapes required in this transition die plate.

It is also important that a venturi effect not be created in the flow of material in any section of the adapter die plate 20 or transition die plates 30, 40, 50 as this would cause a localized decrease in pressure which would result in premature cell formation.

Figure 2:
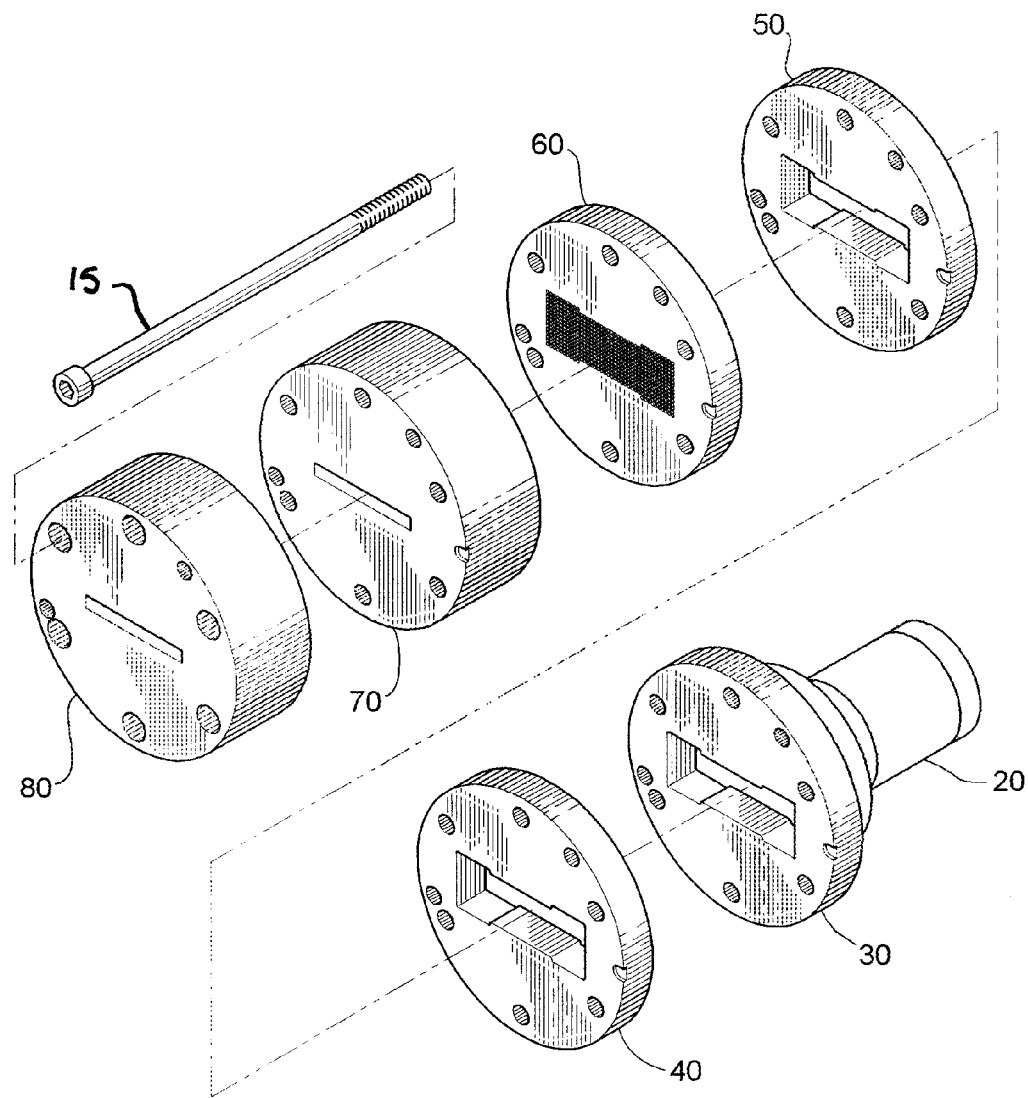
FIG. 2 is an exploded perspective view of the die system of the present invention illustrating each of the die plates.

Transition Die Plate 30:

The extruded material is reshaped and slightly expanded in the transition die plate 30, illustrated in FIGS. 5A-5D. Generally, the transition die plate 30 is a circularly-shaped metal plate, approximately one and one-half inches thick having a front face 31, a rear face 33 and bolt holes 34. The bolt holes 34 extend from the front face 31, through the die plate to the rear face 33. They are used to assemble all of the various dies into the die system 14 and may be located in the same position on each die plate. As illustrated in FIG. 2, a bolt 15 is adapted to pass though the bolt holes in each respective die plate to secure the die plates together.

The transition die plate 30 also includes an oblong flow channel 32, previously described with reference to the adapter die plate 20. The opening 35 of the channel 32 is essentially the same shape as the rear opening 23 of the adapter die plate 20, which allows the continuous flow of the extrudate from the adapter die plate 20 through the transition die plate 30 when the die plates 20 and 30 are seated next to each other. The flow channel 32 transforms the extrudate discharged from the flow channel 26 of the adapter die plate 20 to a shape more generally approaching that of the finished product 16, illustrated in FIG. 2.

Similarly, the function of the transition die plates 40 and 50 serves to transform the extruded material to the finished shape and equalize the flow rate at the outer edges of the extruded material with the flow rate at the center of the extruded material.

Transition Die Plate 40:

Referring now to FIGS. 6A-6D, the transition die plate 40 is similar in appearance to transition die plate 30, having a front face 42 with an opening 44 having generally the same dimensions and shape as the rear opening 36 of transition die plate 30 for continuous flow of the extruded material. The oblong flow channel 46 expands slightly in size such that the size of the rear opening 48 is larger in size than the front opening 44. Similar to the transition die plate 30, the transition die plate 40 is equipped with bolt holes 41 to join the transition die plate 40 to the rest of the die system 14.

Transition Die Plate 50:

Referring to FIGS. 7A-7D, transition die plate 50 is similar in appearance to transition die plates 30 and 40 in that transition die plate 50 has a front face 52 with an opening 54 having generally the same dimensions and shape as the rear opening 48 of transition die plate 40 for continuous flow of the extruded material. The oblong flow channel 56 expands slightly in size such that the size of the rear opening 58 at the rear face 53 is larger in size than the front opening 54. Similar to the transition die plates 30 and 40, the transition die plate 50 is equipped with bolt holes 51 to join the transition die plate 50 to the rest of the die system 14.

Flow Restriction Die Plate 60:

Referring now to FIGS. 8A-8D, the flow restriction die plate 60 consists of a flat plate 62 having a front face 64, a rear face 66 and a flow channel 63 which comprises multiple parallel disposed openings or channels 68 that may be in the form of cylinders, slots, or other shapes. The flow of extruded material is divided into separate streams passing through the flow channel 63. This increases the resistance to flow of the material as the separate streams have a greater amount of surface area for any given volume than one large stream. The resistance to the flow of material through the multiple channels 68 causes an increase in pressure within the material upstream.

FIGS. 8A-8D show the multiple apertures 68 contained within an oblong-shaped area similar to the shape of the rear opening 58 of transition die plate 50. All of the apertures 68 may be substantially round, are contiguous through the material and are substantially parallel to each other and maintain a constant shape from the front face 64 to the rear face 67. One preferred embodiment of the flow restriction die plate 60 contains apertures 68 which are approximately one-eighth of an inch in diameter. The aperture area of individual strands may be constant throughout a part or may vary indicating the desired density or volume requirements at certain part locations.

The number, size and length of the openings 68 in the flow restriction die plate 60 are tailored to each individual foam profile and can be designed to produce an optimal pressure increase for a specific range of volume flow rates. This increase in pressure is an essential part of the production of a cellular composite material. Flow of the material against this resistance also produces heat. The flow restriction die plate 60 is most efficient when flow is equally divided between the multiple openings 68 so that the heat produced is uniformly distributed. The adapter die plate 20 and transition die plates 30, 40, 50 are designed to provide a uniform flow of material to the flow restriction die plate 60. Similar to the other plates, the flow restriction plate 60 includes bolt holes 69 for assembly. The flow restriction die plate 60 creates pressure within the extruder 12 which not only disperses the gas or vapor that forms the cells, making the cell structure uniform, but also enhances the incorporation of the wood flour into the thermoplastic matrix. This enhanced incorporation imparts valuable properties to the extrudate.

The pressure drop in a cylindrical flow channel 68 can be described by the following relationship:

$$\Delta P = \frac{LM}{R_h}\left[\frac{2Q(a+bn)}{R_h An}\right]^n$$

Where:

ΔP is the drop in pressure between the entrance of the channel and the exit of the channel, L is the length of the channel, M is the consistency of the material flowing through the cylinder (consistency is related to viscosity by the Power Law of viscous flow—M is the Power Law constant of the extrudate), $R_h$ is the hydraulic radius (area/perimeter) of the channel cross section, Q is the volumetric flow rate (cubic centimeters per second for example), a and b are shape factors dependent on the geometry of the channel section, and n is the Power Law exponent of the extrudate.

The term "pressure drop" refers to the difference in pressure between the entrance and exit of a flow channel. In simpler terms this means that:

1. The pressure drop in a cylindrical flow channel increases as the length of the flow channel and the consistency, i.e., viscosity, of the fluid increases and decreases as the size, i.e., radius, of the flow channel increases.

2. The pressure drop in a cylindrical flow channel increases as the flow rate increases. However, this relationship is affected by the Power Law exponent describing the fluid. The Power Law exponent is a measure of what happens to the fluid as it flows faster or slower. Water, for instance, has a Power Law exponent of 1. The viscosity of water is not affected by how fast it is moving. Polymers, i.e., plastics, which are used in the present invention, are shear thinning fluids. This means that the faster they flow, the less viscous they are. Stated another way, the faster they flow, the thinner they are. The exponent in this case is less than 1. The Power Law exponent of the cellular composite material of the present invention is typically about 0.24.

3. The pressure drop in a cylindrical flow channel decreases with the cube of the radius of the flow channel. However, this relationship is also affected by the Power Law exponent.

Thus, the pressure an extrudate is subjected to as it enters the flow restriction die plate 60 is related to: 1) the amount of material, i.e., the volumetric flow rate, coming out of the extruder 12 divided by the number of flow channels 68 in the flow restriction die plate 60. This is the flow rate through an individual channel 68 where the equation above describes the pressure drop; 2) the length of the individual flow channels 68; 3) the radius of the individual flow channels 68; and 4) the characteristics of the fluid itself.

Therefore, as the length of the flow channels 68 is increased, the pressure is also increased. Further, as the radius of the flow channels 68 is increased, the pressure is increased. As more flow channels 68 are added to the flow restriction die plate 60, the flow 10 rate through each flow channel 68 is decreased and the pressure is decreased. Conversely, as the number of flow channels 68 is decreased, the flow rate through each flow channel 68 is increased, which increases the flow pressure.

Pressure is important because every gas has a certain pressure at a given temperature at which temperature it is soluble, i.e., dissolved, in the fluid into which it is mixed. For the present invention, it is preferred to have gases that will create the cellular structure of the composite of the present invention to be dissolved in the composite extrudate for a couple of reasons. First, the cells are dispersed more completely. Second, when the cells are dissolved, the cells that are formed when the gasses come out of solution will be more numerous and therefore smaller.

A similar relationship holds for rectangular flow channels 68. In this case the height of the channel 68 is analogous to the radius of a cylindrical flow channel. As the height of the channel 68 increases, the pressure decreases. Length, flow rate, consistency, and Power Law exponent have the same effects as they did in the case of a cylindrical flow channel.

The heat generated by flow of the fluid through the flow channels is another important consideration. Heat is important because cellular composites are composed of a large number of cells or bubbles. The cells grow until their walls become so thin that they break. The cells may break open to the exterior or they may break open and combine with adjacent cells, a process known as coalescence. The strength of the cell walls in cellular composites is directly related to the temperature of the composite. Higher temperatures weaken the cell walls. The temperature of a fluid flowing through a cylindrical channel 68 is directly related to the length of the flow channel 68, the consistency of the fluid, and the velocity of the fluid, i.e., the higher the flow rate, the higher the velocity. The temperature is inversely related to the radius of the flow channel 68. This means that more flow channels 68, i.e., less flow in each, cause less temperature increase as do larger flow channels 68. Longer channels 68 cause more temperature increase. Thus, the same factors that cause an increase in temperature, which is deleterious to the system, cause an increase in pressure, which is beneficial. Thus, a balance must be achieved between the flow rate, based on the number of channels 68, and the length and radius of the channels 68 such that the pressure is high enough to dissolve the gasses used to produce the cells and to keep the temperature low enough to keep the cells intact.

The volume of the transition die plates 30, 40, and/or 50 is related to the amount of extrudate material available to flow through any given channel 68 of the flow restriction die plate 60. The amount of material available to flow through any given channel 68 depends on the number of channels 68, the pressure forcing the extrudate material through the transition die plates 30, 40, and/or 50, and the restrictions placed on the material as it tries to find a flow path. If the volume of the transition die plates 30, 40, and/or 50 is too small, the extrudate will be forced to flow at a high velocity and will tend to rush through the center of the flow restriction die plate 60. The material flowing through the channels 68 in the center will be traveling faster than the material flowing through the outer portions of the flow restriction die plate 60 causing the material in the center to overheat. If the volume of the transition die plates 30, 40, and/or 50 is too large, the extrudate will become stagnant in some areas cutting down the effective area of the flow restriction die plate 60 and causing the material in areas that are not stagnant to flow faster than necessary, again causing overheating.

In both cases, the finished profile will contain large voids and gas pockets due to breaking of the cells. Thus if the volume of the transition die plates 30, 40, and/or 50 is too small for the number of flow channels 68 and the pressure of the composite flow, the flow will be directed towards the center of the flow restriction die plate 60 more than towards the sides. This will increase the heat generated in the center of the composite flow. If the volume of the transition die plates 30, 40, and/or 50 is too large, material will tend to rest in the outer potions of the transition die plates 30, 40, and/or 50 and flow more rapidly than necessary in the center. By balancing the volume of the transition die plates 30, 40, and/or 50 with the amount of material passing through it in a given time interval, the flow through all channels 68 can be equalized. This will make the temperature increase in each flow channel 68 more equal so that each individual channel 68 is less likely to overheat.

Compression Die Plate 70:

As illustrated in FIGS. 9A-9D, the compression die plate 70 includes a front face 72, a rear face 74, and a flow channel 76 having a front opening 78, and a rear opening 79. The compression die plate 70 is designed to mold the extruded material passing out of the individual flow channels 68 of the flow restriction die plate 60 back into one mass of extruded material and to create a linear pressure drop between the rear opening 67 of the flow restriction die plate 60 and the shaping die plate 80.

At some point between the rear opening 67 of the flow restriction die plate 60 and the die system 14 exit, the pressure under which the extruded material is contained will drop to a level where cells will begin to form in the material. Stated previously, extrusion of cellular, i.e., foamed, wood plastic composites depends on the formation of gas bubbles or cells within the composite matrix. If the gas can be introduced under pressure, it will be more evenly dispersed throughout the matrix resulting in a more uniform cell structure with an increased number of cells. This type of structure is desirable. Development of pressure in the extrusion process is a result of restriction of the flow of the extrudate. The compression die plate 80 acts to fuse the separate streams issuing from the apertures 68 of the flow restriction die plate 60 into a single stream of material and maintain the melt pressure at a level which will prevent premature development of cells in the material.

The strands are compressed and shaped in the compression die plate 70. The heated outer surface of each of the strands acts to anneal the strands together. In addition, as the individual strands are compressed against each other, the localized high temperatures on the outer surface of each strand cause the bonding of the thermoset materials to pendent hydroxy units on the cellulose molecular chain. If cross-linking agents are included in the starting material, the cross-linking agents act to form an exothermic reaction on the outer surface of each strand thereby facilitating the bonding of the thermoset materials to pendent hydroxy units on the cellulose molecular chain. Similar to the other plates, the compression die plate 70 includes bolt holes 71 for assembly.

The front opening 72 of the flow channel 76 of the compression die plate 70 is a large profile equal to the area of all of the channels 68 within the flow channel 63 in the flow restriction die plate 60 plus the area of the metal that defines the areas between the multiple channels 68 together which make up the flow channel 63 of the flow restriction die plate 60. The profile tapers, i.e., becomes smaller, rapidly to a size equal to that of the front face 82 of the shaping die plate 80.

As the extrudate travels through this tapered flow channel 76, the same amount of material must travel through the rear opening 79 of the compression die plate 70 that becomes progressively smaller. To do this, the extrudate material must move faster. This is extensional flow and causes an increase in pressure in the compression die plate 70. Since the speed of the material is increasing, more heat will be generated. The flow channel 76 of compression die plate 70 should taper at a rate between 15% and 30% per unit length. If the amount of taper is less than 15%, the pressure in the compression die plate 70 will be low, the material passing through the individual flow channels 68 of the flow restriction die plate 60 will not fuse together and voids will be present in the final product 16. If the taper is greater than 30% the acceleration will be too great causing a build up of heat that will cause the cells to break down and again create voids in the material.

Shaping Die Plate 80:

As illustrated in FIGS. 10A-10D, the shaping die plate 80 includes a front face 82, a rear face 84, and a flow channel 86 having a front opening 85 and a rear opening 87. The initiation of cell formation should occur at the front face 82 of the shaping die plate 80. Because of the high viscosity and low melt strength of the composite, it is advantageous for expansion to be initiated at a very slow rate. This helps to disperse the gas which forms the cells and prevent the sudden formation of large gas pockets within the extruded profile. This is accomplished by initiating cell formation at the channel 86 near the front face 82 or entrance of the shaping die plate 80 and controlling the rate of expansion within the shaping die plate 80 so that numerous cells have been initiated when the material exits the rear face 84 of the shaping die plate 80. This is also the external exit of the cellular composite die system 14.

The composite material will continue to expand for some time after exiting the die system 14. The amount of expansion is not the same in all directions but is related to the distance from the center of mass of the profile to the point of expansion. The exit of the shaping die plate 80 at the rear face 84 is designed to shape the material in such a way that the fully expanded material will approximate the shape of the desired profile. Similar to the other die plates, the shaping die plate includes bolt holes 81 for assembly.

In the present invention, the volume of flow channels 32, 46 and/or 56 of the transition die plates 30, 40, and/or 50 is related to the volume of the shaping die plate 80. A ratio of 2:1 (transition die volume:shaping die volume) is optimal. The ratio can range from 1.05:1 to 3.45:1. At a ratio less than 1.05:1 the volume is too small and center flow heating will occur. At a ratio greater than 3.45:1 the volume of the transition die is too large and stagnation will occur.

One of the main advantages to this process is that the molded product has virtually no expansion after it leaves the molding die. This is due to the low temperature processing in the extruder and die system.

Shaping die plates 80 of any shape are contemplated within this invention, including decorative household moldings such as crown moldings, chair rails, baseboards, door moldings, etc., picture frames, furniture trim and other products mentioned in this application. In the shaping die plate 80, the final shape is maintained. If cross-linking agents are included in the starting material, the cross-linking agents continue to react in the shaping die plate 80, thereby bonding the individual strands together.

Cooling Tank 18:

After the molded product 16 leaves the shaping die plate 80, it is fed to a vented cooling tank 18, which is a conveyor system (known to the art) for conveying the material through a cooling process which may be under negative pressure especially if the product has hollow cores. A representative conveyor-type cooling tank is produced by Cincinnati Milacron. The cooling tank 18 may include a vacuum water bath in the preferred embodiment. The length of the molded product 16 is determined by the length of the cooling tank. Therefore, another advantage of the molded product 16 is that it has potentially unlimited length in that it can continually be extruded from the system.

The molded product 16 is cooled in the vented cooling tank 18 and transported over rollers (not shown) by a pulling mechanism (not shown) known to the art. The cooled molded product 16 is then cut to the desired lengths using conventional means.

The molded product 16 can then be covered with a vinyl material, plastic laminate, paint or other suitable coverings known to the art. An inline crosshead extrusion die, known to the art, may be installed down-stream of the puller to apply a capstock of known compounds as an exterior finish.

Cellulose Plastic Composite

Because of the designed flow characteristics, the die system 14 creates a flow restriction with minimal frictional heating of the extruded composite material. The flow restriction die plate 60 creates pressure within the extruder 12 which not only disperses the gas or vapor that forms the cells, making the cell structure uniform, but also enhances the incorporation of the wood flour into the thermoplastic matrix. This enhanced incorporation imparts valuable properties to the composite.

The cellulose plastic composite extrudate produced with the cellular composite extrusion die 14 has the following unique properties. This composite material may be based on thermoplastic resins that are not typically classified as engineering resins. Polyethylene is an example. The composite material produced from polyethylene with this invention may have a density of from 0.50 gm/cc to 0.90 gm/cc, preferably 0.65 gm/cc to 0.75 gm/cc, compared to the resin itself which has a density of 0.95 gm/cc. The flexural modulus of elasticity of this composite material ranges from 100 kilo-pounds per square inch (ksi) to 250 ksi compared to the resin itself which has a flexural modulus of 150 ksi. The cellular material produced is lower in density than a traditional composite material, such as STRANDEX material (Strandex Corporation, Madison, Wis.). The traditional material has a density of 1.12 to 1.18 grams per cubic centimeter. The lower density makes the cellular material easier to fasten, cut, and shape.

The polyethylene based composite produced using this invention has a coefficient of linear thermal expansion (CLTE) of $24.5 \times 10^{-6}$ in/in-° F. to $32.0 \times 10^{-6}$ in/in-° F. compared to the resin itself which has a CLTE of $70 \times 10^{-6}$ in/in-° F. This composite material contains low cost filler at ratios of from 0.75:1 to 1:1 (filler to resin ratios).

The incorporation of wood fiber into the polyethylene composite allows the composite to be cut, planed, machined, and fastened in the same way as wood while being resistant to termites and fungal decay and having a low density. The polyethylene based composite produced with this invention has improved impact resistance compared to other cellulose plastic composites. Swelling induced by the uptake of moisture is lower in this composite (0.93% following 24 hr. immersion) than in wood (2.6% for ponderosa pine) or higher density composites (1.15% for STRANDEX composite). This combination of properties in a polyethylene based cellulose plastic composite is unique.

Example

Reference is now made to the following example.

A formulation containing 100 parts per hundred resin (phr) high density polyethylene and 67 phr wood flour has a consistency (Power Law constant) equal to 28.15 Pa-sec and a Power Law exponent equal to 0.36. These values may be determined by any standard method of determining the rheology of a polymer extrudate that behaves as a Power Law fluid.

Once these values are known they may be used to calculate the pressure produced when the extrudate flows through channels of various sizes and shapes. A general equation describing the pressure produced when a Power Law fluid flows through a channel of some simple cross section was developed by Kozicki (Kozicki, W., et al., "Non-Newtonian flow in ducts of arbitrary cross section", Chemical Engineering Science, 1966, vol. 21, pp. 665-679:

$$\Delta P = \frac{LM}{R_h} \left[ \frac{2Q(a+bn)}{R_h A n} \right]^n$$

Where:

$\Delta P$=the drop in pressure between the entrance of the channel and the exit of the channel.

L=the length of the channel

M=the Power Law constant of the extrudate $R_h$=the hydraulic radius (area/perimeter) of the channel cross section Q=the volumetric flow rate a and b are shape factors dependent on the geometry of the channel section n=the Power Law exponent of the extrudate If a cellular composite profile with the nominal dimensions of a 1×4 (0.75"×3.5") is desired and the desired rate of production and density of the profile are 6 ft./minute and 0.9 g/cubic centimeter respectively then the system for production of this profile according to this invention may be designed in the following way.

The density of an extrudate made from the given formulation will be about 1.12 g/cubic centimeter. The desired production rate is given as 189 cubic inches of profile with a density of 0.9 g/cc per minute (0.75"×3.5"×6 ft/min×12"/1'). This is equivalent to 3097 cubic centimeters of profile with a density of 0.9 g/cm³ per minute. The amount of extrudate at a density of 1.12 g/cm³ required to produce this amount of profile is 2489 cubic centimeters per minute or 41.5 cm³/second. This is the desired volume flow rate.

The desired change in density from 1.12 g/cm³ to 0.9 g/cm³ will result in a three dimensional expansion. 1 cm³ of material with a density of 0.90 g/cm³ will result from the expansion of 0.8036 cm³ of material with a density of 1.12 g/cm³. 0.8036 cm³ is the volume of a 0.930 cm cube. Therefore the cross section of the shaping die should be 0.75"×0.93=0.70" by 3.5"×0.93=3.26". This is equivalent to 1.77 cm by 8.27 cm.

Assuming that it has been determined experimentally that the gas used will begin to escape and nucleate (initiate bubble formation) at a pressure of 1000 kPa and that nucleation should occur at the entrance of the shaping die, then the length of the shaping die can be calculated to be 10 cm using the general equation above with shape factors a=0.3358 and b=0.8428. (a and b may be calculated using the methods presented by Kozicki.

If the pressure required to dissolve the gas in the extrudate is 12000 kPa then a pressure drop of approximately 10000 kPa must occur in the flow restriction die. This pressure drop may be obtained through the use of 15 rectangular flow channels measuring 2.54 cm by 0.5 cm (a=0.3441 and b=0.8531) with a length of 7.6 cm. The flow channels would be arranged with their long dimensions parallel, separated by 0.2 cm walls. The dimensions of the entire field of flow channels would then be 2.54 cm in height by 10.3 cm in width.

The entrance to the molding die would conform to the dimensions of the flow channel field. The area of this cross section would be 26.16 cm2. The exit of the molding die conforms to the dimensions of the shaping die with a cross sectional area of 1.77 cm×8.27 cm=14.64 cm$^2$. Following the preferred reduction of 15% to 30% of the molding die volume per unit length the length of the molding die will be between 2.9 cm and 1.5 cm.

The preferred ratio of the open volume of the transition die to the open volume of the shaping die is 2.1:1. The entrance of the transition die conforms to the dimensions of the exit of the adaptor die while the exit conforms to the dimensions of the flow channel field of the flow restriction die. The simplest shape connects these two cross sections with straight lines. This shape may be constructed and the resulting volume analyzed through the use of a computer aided drafting (CAD) program. Such programs are well known to die designers and machinists. The length of the transition die may be determined through a trial and error process.

It is understood that the invention is not confined to the particular construction and arrangement of parts herein illustrated and described, but embraces such modified forms thereof as come within the scope of the following claims.

What is claimed is:

1. A die system for extruding a cellular, foamed extrudate from an extruder, the extruder including an exit opening, and forming a molded extrudate product having a substantially uniform cell structure from a cellulosic fibrous-polymer composite material, comprising:
   a. an adapter die plate, removably connected to the extruder for receiving the extrudate from the exit opening of the extruder, the adapter die plate including a front opening, a rear opening and a flow channel connecting the front opening to the rear opening, wherein the flow channel of the adapter die plate decreases in cross-sectional area from the front opening to an intermediate portion of the flow channel between the front opening and the rear opening, and increases in cross-sectional area from the intermediate portion to the rear opening;
   b. at least one transition die plate adjacent the adapter die plate, the transition die plate including a front opening, a rear opening and a flow channel connecting the front opening to the rear opening;
   c. a flow restriction die plate adjacent the transition die plate, the flow restriction die plate having a front opening, a rear opening and a flow channel connecting the front opening to the rear opening, wherein the flow channel includes a plurality of stranding channels to divide the flow of extrudate, wherein the stranding channels have a diameter and length to provide sufficient resistance pressure to the extrudate flow such that resistance pressure of the extrudate entering the adapter die plate is increased, wherein the increase in resistance pressure alters extrudate entering the adapter die plate such that the extrudate entering the adapter die plate is characterized by increased uniform cell structure and lower density, wherein the flow channel of the transition die plate is shaped such that equal amounts of extrudate are delivered to the stranding channels;
   d. a compression die plate adjacent the flow restriction die plate and comprising a front opening, a rear opening and a flow channel, wherein the compression die plate front opening is adjacent the flow restriction die plate rear opening, wherein the compression die plate flow channel is shaped to reform the extrudate into a single stream of extrudate and wherein further the compression die plate flow channel is shaped to maintain melt pressure at a level which will prevent premature development of cells in the material;
   e. a shaping die plate adjacent the compression die plate and comprising a front opening, a rear opening and a flow channel, wherein the shaping die plate front opening is adjacent the compression die plate rear opening and wherein the shaping die plate flow channel is shaped to approximate the shape of the desired profile of a final extruded product and to control rate of cell development and expansion so that large numbers of uniform cells are produced, and wherein a ratio of a volume of the flow channel of the at least one transition die plate to a volume of the flow channel of the shaping die plate ranges from 1.05:1 to 3.45:1.

2. The die system of claim 1 wherein the cellulosic fibrous-polymer composite material has a ratio of cellulosic fibers to the thermoplastic material between approximately 4:1 and 1:0.

3. The die system of claim 1 wherein the composite material entering the adapter die plate has a density from 0.50 gm/cc to 0.90 gm/cc.

4. The die system of claim 1, wherein the ratio of the volume of the flow channel of the at least one transition die plate to the volume of the flow channel of the shaping die plate is about 2:1.

5. The die system of claim 1, wherein the flow channel of the compression die plate tapers at a rate between 15% and 30% per unit length.

6. A process for forming a cellular, foamed extrudate having a substantially uniform cell structure from a cellulosic fibrous-polymer composite material, comprising:
   a. mixing the composite material in a hopper;
   b. forwarding the mixed composite material to an extruder to form an extrudate;
   c. passing the extrudate through an adapter die plate removably connected to the extruder for receiving the extrudate from the exit opening of the extruder, the adapter die plate including a front opening, a rear opening and a flow channel connecting the front opening to the rear opening, wherein the flow channel of the adapter die plate decreases in cross-sectional area from the front opening to an intermediate portion of the flow channel between the front opening and the rear opening, and increases in cross-sectional area from the intermediate portion to the rear opening;
   d. passing the extrudate through at least one transition die plate adjacent the adapter die plate, the at least one transition die plate including a front opening, a rear opening and a flow channel connecting the front opening to the rear opening wherein the transition die plate flow channel has a shape designed to transform the extruded material discharged from the flow channel of the adapter die plate to a shape more generally approaching that of a finished extruded product;

e. passing the extruded material through a flow restriction die plate adjacent the transition die plate, the flow restriction die plate having a front opening, a rear opening and a flow channel connecting the front opening to the rear opening, wherein the flow channel includes a plurality of stranding channels to divide the flow of extrudate, wherein the stranding channels have a diameter and length to provide sufficient resistance pressure to the extrudate flow such that resistance pressure of the extrudate entering the adapter die plate is increased, wherein the increase in resistance pressure alters extrudate entering the adapter die plate such that the extrudate entering the adapter die plate is characterized by increased uniform cell structure and lower density, wherein the flow channel of the transition die plate is shaped such that equal amounts of extrudate are delivered to the stranding channels;

f. passing the extruded material through a compression die plate adjacent the flow restriction die plate, the compression die plate comprising a front opening, a rear opening and a flow channel, wherein the compression die plate front opening is adjacent the flow restriction die plate rear opening, wherein the compression die plate flow channel is shaped to reform the extrudate into a single stream of extrudate and wherein further the compression die plate flow channel is shaped to maintain melt pressure at a level which will prevent premature development of cells in the material;

g. passing the extruded material to a shaping die plate, the shaping die plate adjacent the compression die plate and comprising a front opening, a rear opening and a flow channel, wherein the shaping die plate front opening is adjacent the compression die plate rear opening and wherein the shaping die plate flow channel is shaped to approximate the shape of the desired profile of a final extruded product and to control rate of cell development and expansion so that large numbers of uniform cells are produced, and wherein a ratio of a volume of the flow channel of the at least one transition die plate to a volume of the flow channel of the shaping die plate ranges from 1.05:1 to 3.45:1; and h. cooling the extruded product material.

7. The process of claim 6 wherein the composite entering the adapter die plate has a density from 0.50 gm/cc to 0.90 gm/cc.

8. The process of claim 6 wherein the extruder operates at a temperature between 150°-200° F. and a flow rate between about 100 and 2500 pounds per hour.

9. The process of claim 6 wherein the adapter die plate flow channel has a diameter between 50 mm and 300 mm.

10. The process of claim 6 wherein the at least one restriction die plate comprises at least three transition die plates to transform the composite to the finished shape and equalize the flow rate at the outer edges of the extruded material with the flow rate at the center of the extruded material.

11. The process of claim 6 wherein the number and size of the stranding channels in the flow restriction die plate are designed to produce an optimal pressure increase for a specific range of volume flow rates.

12. The process of claim 6 wherein the stranding channels are in the form of cylinders or slots.

13. The process of claim 6 wherein the ratio of the volume of the flow channel of the at least one transition die plate to the volume of the flow channel of the shaping die plate is about 2:1.

14. The process of claim 6 wherein the flow channel of compression die plate tapers at a rate between 15% and 30% per unit length.

15. The die system of claim 1 wherein the at least one transition die plate comprises at least three transition die plates.

* * * * *